(12) United States Patent
Thantipwan et al.

(10) Patent No.: US 12,462,120 B2
(45) Date of Patent: Nov. 4, 2025

(54) METHOD AND APPARATUS FOR SUSTAINING A CONSTANT TIME PERIOD VALUE FOR OPERATION AND ANSWERING BY A TAG FOR AN NFC TRANSCEIVER

(71) Applicant: Silicon Craft Technology Public Company Limited (SICT), Bangkok (TH)

(72) Inventors: Thaweesak Thantipwan, Bangkok (TH); Ohmmarin Sathusen, Bangkok (TH); Tanawat Hongthai, Bangkok (TH)

(73) Assignee: Silicon Craft Technology Public Company Limited (SICT), Bangkok (TH)

( * ) Notice: Subject to any disclaimer, the term of this patent is extended or adjusted under 35 U.S.C. 154(b) by 120 days.

(21) Appl. No.: 18/570,015

(22) PCT Filed: Jul. 16, 2021

(86) PCT No.: PCT/IB2021/056424
§ 371 (c)(1),
(2) Date: Dec. 13, 2023

(87) PCT Pub. No.: WO2023/285866
PCT Pub. Date: Jan. 19, 2023

(65) Prior Publication Data
US 2024/0273316 A1  Aug. 15, 2024

(51) Int. Cl.
G06K 7/10     (2006.01)
H04B 5/77    (2024.01)

(52) U.S. Cl.
CPC ..... G06K 7/10237 (2013.01); G06K 7/10297 (2013.01); H04B 5/77 (2024.01)

(58) Field of Classification Search
CPC .. G06K 7/10237; G06K 7/10297; H04B 5/70; H04B 5/77; H04B 5/79
See application file for complete search history.

(56) References Cited

U.S. PATENT DOCUMENTS

2008/0122584 A1* 5/2008 Itasaki ............... G06K 19/0723
                                                            340/10.51
2012/0077593 A1   3/2012 Sarmenta
                       (Continued)

OTHER PUBLICATIONS

International Search Report and Written Opinion issued in International Application No. PCT/IB2021/056424 dated Oct. 21, 2021.

*Primary Examiner* — Omer S Khan
(74) *Attorney, Agent, or Firm* — Troutman Pepper Locke LLP

(57) ABSTRACT

The present invention involves a method and apparatus for sustaining a constant time period value for operation and answering by a tag for an NFC transceiver using a time control circuit in the tag for controlling signal transmission between the tag and the transceiver to be in accordance with the predetermined time period. In this regard, the first activation of the time control circuit is based on an instruction obtained from the NFC transceiver. Then, the transceiver waits for one or more answer values until the time control circuit generates a tick and the tag sends first answering to the transceiver. Then, the tag restarts constant time period operation after the tick. In time duration before the next tick, the transceiver starts releasing the next instruction to the tag. Such process proceeds until the transceiver obtains amount of predetermined data.

21 Claims, 5 Drawing Sheets

(56) References Cited

U.S. PATENT DOCUMENTS

| | | |
|---|---|---|
| 2013/0196595 A1 | 8/2013 | Byrne et al. |
| 2015/0100499 A1 | 4/2015 | Dua |
| 2016/0080591 A1* | 3/2016 | Asakura .................. H04W 4/80 358/1.15 |
| 2018/0091193 A1* | 3/2018 | Hagedorn .......... G06K 7/10366 |
| 2020/0167623 A1 | 5/2020 | Oberleitner et al. |

* cited by examiner

METHOD AND APPARATUS FOR SUSTAINING A CONSTANT TIME PERIOD VALUE FOR OPERATION AND ANSWERING BY A TAG FOR AN NFC TRANSCEIVER

This application is a U.S. national stage application of International Application No. PCT/IB2021/056424, filed on Jul. 16, 2021, the entire contents of which application is hereby incorporated by reference in its entirety.

FIELD OF THE INVENTION

This invention relates to a method and apparatus for sustaining a constant time period value for operation and answering by tag for an NFC transceiver

BACKGROUND OF THE INVENTION

NFC (Near Field Communication) system is a wireless near field communication using electromagnetic wave in the frequency range of 13.56 MHz in the communication wherein the NFC system consists of a transceiver and a tag. The NFC usage becomes more popular in particular in various mobile phones. Advantages of the NFC system is convenience and the absence of need of external power source for the tag due to the use of power source from the transceiver in energization and communication.

Conventionally, NFC is applied in identification via Unique Identifier (UID) or in data storage in the tag's memory. However, due to several advantages, it is further used in connecting other devices to the tag e.g., microcontrollers or sensors by applying the NFC in sending-receiving data to connected devices.

Some types of application require data acquisition wherein a sampling rate must be accurate so that values can be correctly analyzed e.g., periodic data acquisition from a sensor or time varying tag parameters. These periodic data acquisitions can be performed via several methods e.g., providing the tag with an internal time controller which stores data in the tag's memory at predetermined time. Problems can occur in said method in case the tag's memory is too small for the data to be stored and in case the tag is not provided with a highly accurate clock signal generator.

Another method is using an NFC transceiver (200) in controlling time value for a constant acquisition of data from the tag (202) as shown in the flowchart in FIG. 1 and the timeline chart in FIG. 2 wherein the transceiver starts making a delay T1 (100) and then sending an instruction (101) via radio waves (201) to the tag (202) and, after receiving the instruction, the tag process the instruction and send an answer value (102) then, after the transceiver receiving value, the transceiver stores the value for processing (103) wherein the time used in operation from sending the instruction to processing after receiving the answer value by the transceiver is T2 (107). Then the transceiver will make a delay T3 (104). Total time used in one cycle of operation, T1+T2+T3, is operation period T4 (108) to be accurately controlled. The instruction sending count is compared with the number required by the transceiver (105, 106) which recirculates sending-receiving cycles according to the required number. The communication pattern thereof is shown in the timeline chart in FIG. 2.

However, controlling the time values of T1 (100) and T3 (104) using the transceiver device itself is relatively difficult, particularly in mobile phones where the time values of T1 and T3 are not equal in each cycle which results in total the time period T4 (108) for sampling being variable. Users and developers usually need to control timing using fundamental operating system software programs released by the NFC-equipped mobile phones' manufacturers wherein the timing control in each read cannot be accurately performed and deviation may occur.

In view of the above-mentioned background of the invention, state of the art, time period value control in case of NFC-equipped mobile phones, which control data acquisition time period value using software, is convenient in terms of carrying and light weight for users but reading time cannot be accurately controlled; and in case of using large memory on the tag, in which data acquisition at predetermined times can be accurately performed, has a disadvantage of requiring a larger battery which unnecessarily increases both weight and cost. In view of the above, none of the art in this field can achieve accuracy that is necessarily required in any measuring devices which measure time varying parameters e.g., sensors. Therefore, we propose the present invention that achieve an accurate control of sampling rate and that is characterized in that cost and size of the tag are reduced while effectiveness thereof is improved. However, the present invention is not intended to be limited by these advantages, but they are merely mentioned as outstanding features.

SUMMARY OF THE INVENTION

The present invention relates to a method for sustaining a constant time period value (307) for operation and answering by a tag (202) for an NFC transceiver (200), comprising:
the NFC transceiver (200) sending an instruction to the tag (202) to cause the tag (202) to start a process for sending one or more answer values at the predetermined time period value (307);
a time control circuit (210) in the tag (202) started operating for a predetermined time period value (307) or Tperiod;
when having operated for the predetermined time period value (307) completely, the time control circuit (210) sending a tick (216) and restarting counting automatically;
when the tick (216) is detected by the tag (202), sending the one or more answer values to the NFC transceiver (200) and the tick (216) to be applied for generating one or more operation indicating signals (311) to cause other one or more other circuits (211) to start periodic operation;
the NFC transceiver (200) processing the acquired one or more answer values;
the NFC transceiver (200) sending the next instruction to receive the one or more answer values, sending the next instruction to the tag (202) being performed consecutively and automatically until the NFC transceiver (200) receives required amount of data completely; and
when the NFC transceiver (200) receives required amount of data completely, the NFC transceiver (200) sending a stopping instruction to the tag to stop periodic operation and sending.

According to the present invention, the tick (216) is sent from the time control circuit (210) generated at a constant rate at the predetermined time period value (307).

According to the present invention, the predetermined time period value (307) is set to be constant by setting before the operating process is started.

According to the present invention, at least one line of the one or more operation indicating signals (311) is present.

According to the present invention, the one or more other circuits (211) have a different operating duration (T8) depending on requirements of the controlled other circuits (211).

According to the present invention, a period from starting the one or more answer values sent by the tag (202) to the NFC transceiver (200) to the completion of sending is period T5 (308).

According to the present invention, after the NFC transceiver (200) receives the one or more answer values, the one or more answer values is processed, and a delay may be performed before sending the next instruction to the tag (202) within period T6 (309).

According to the present invention, a period from sending the next instruction by the NFC transceiver (200) to sending the next one or more answer values by the tag (202) after the tick (216) is detected is period T7 (310).

According to the present invention, the processing of the instruction sent from the NFC transceiver (200) by the tag (202) is completed, and the one or more answer values is ready to be sent to the NFC transceiver (200) always within the period T7 before the next tick (216) is detected from the time control circuit (210).

According to the present invention, the sum of T5 (308), T6 (309), and T7 (310) is the predetermined time period value (307).

According to the present invention, T8 is not more than the sum of T5 (308), T6 (309), and T7 (310).

According to the present invention, T5 (308), T6 (309), and T7 (310) are not restricted to a certain constant time value and can be different in each cycle of signal sending/receiving but the sum thereof must be equal to the time period value (307).

The present invention also relates to an apparatus for sustaining a constant time period value (307) for operation and answering by a tag (202) for an NFC transceiver (200), comprising:
  a time control circuit (210) provided to allow starting and stopping time counting according to an instruction from the NFC transceiver (200) and to set a time period value (307) to generate a tick (216) for automatic restarting of time counting when reaching the predetermined time period value (307), the generation of the tick (216) starting from receiving a input reference signal (215) from an operation processing and control circuit (208) and processed via apparatus in the time control circuit (210) comprising:
    an integrator (212) provided to determine a clock signal count as a counter in case the input reference signal (215) is a digital signal or to integrate periodic value (integrator) in case the input reference signal (215) is an analog signal;
    a time value compensator (213) for modifying the signal acquired from the integrator (212) to be a suitable value in case the input reference signal (215) is deviated from a required value; and
    a comparator (214) for comparing a compensated signal (218) from the time value compensator (213) and one or more comparison signals (219) wherein when the compensated signal (218) equals to the one or more comparison signals (219), the comparator (214) will generate the tick (216) provided to restart in an automatic counting and send it to an operation processing and control circuit (208) wherein the tick (216) is used in starting a process for sending one or more answer values to the NFC transceiver (200) and the tick (216) is simultaneously used in generating one or more operation indicating signals (311) to cause other circuits (211) to perform as periodic operation.

According to the present invention, the input reference signal (215) which is the digital signal is in the form of the clock signal.

According to the present invention, the input reference signal (215) which is the analog signal is in the form of a voltage value or a current value.

According to the present invention, the one or more comparison signals (219) is controlled by the operation processing and control circuit (208).

According to the present invention, the one or more comparison signals (219) is provided for determining the system time period value (307).

According to the present invention, the time control circuit (210) can be as an analog circuit or a digital circuit.

According to the present invention, the input reference signal (215) deviates from the required value i.e., the clock signal is incorrect, incomplete, has incorrect frequency; or voltage value or current value is different from the required value.

According to the present invention, the one or more other circuits (211) include sensor connecting circuit, amplifying circuit, analog-to-digital converting circuit, digital-to-analog converting circuit, reference signal generating circuit, clock signal generating circuit, legs, or wires for connection with external devices.

The purpose of this invention aims to control signal acquisition for processing to obtain accurate values suitable for application in measurements where time factor significantly affects data values. In addition, the present invention also aims to reduce the cost of tag, make it convenient for carrying, and easy to use. Furthermore, the present invention is also advantageous in other aspects.

BRIEF DESCRIPTION OF THE DRAWINGS

The unlimited form of embodiments of the present invention is explained by way of examples with reference to accompanying drawings that are schematic views made without the intention to be to scale but merely to be a guideline for practice for a person ordinarily skilled in the art.

Several objects, characteristics, aspects, and advantages of the present invention will be explained more clearly in the detailed description of the invention featuring the most preferable embodiment of the present invention together with accompanying drawings in which elements are represented by corresponding numbers. The present explanation is not intended to limit the scope of the present invention as disclosed. Modifications and variations will be apparent to a person ordinarily skilled in the background art. The present embodiment is selected to best describe the principle of the present invention and its partial applications to allow a person ordinarily skilled in the art to understand the present invention for various embodiments and modifications suitable for consideration. The scope of the present invention is defined by the claims and their equivalence.

DETAILED DESCRIPTION OF THE INVENTION

Figure 1:
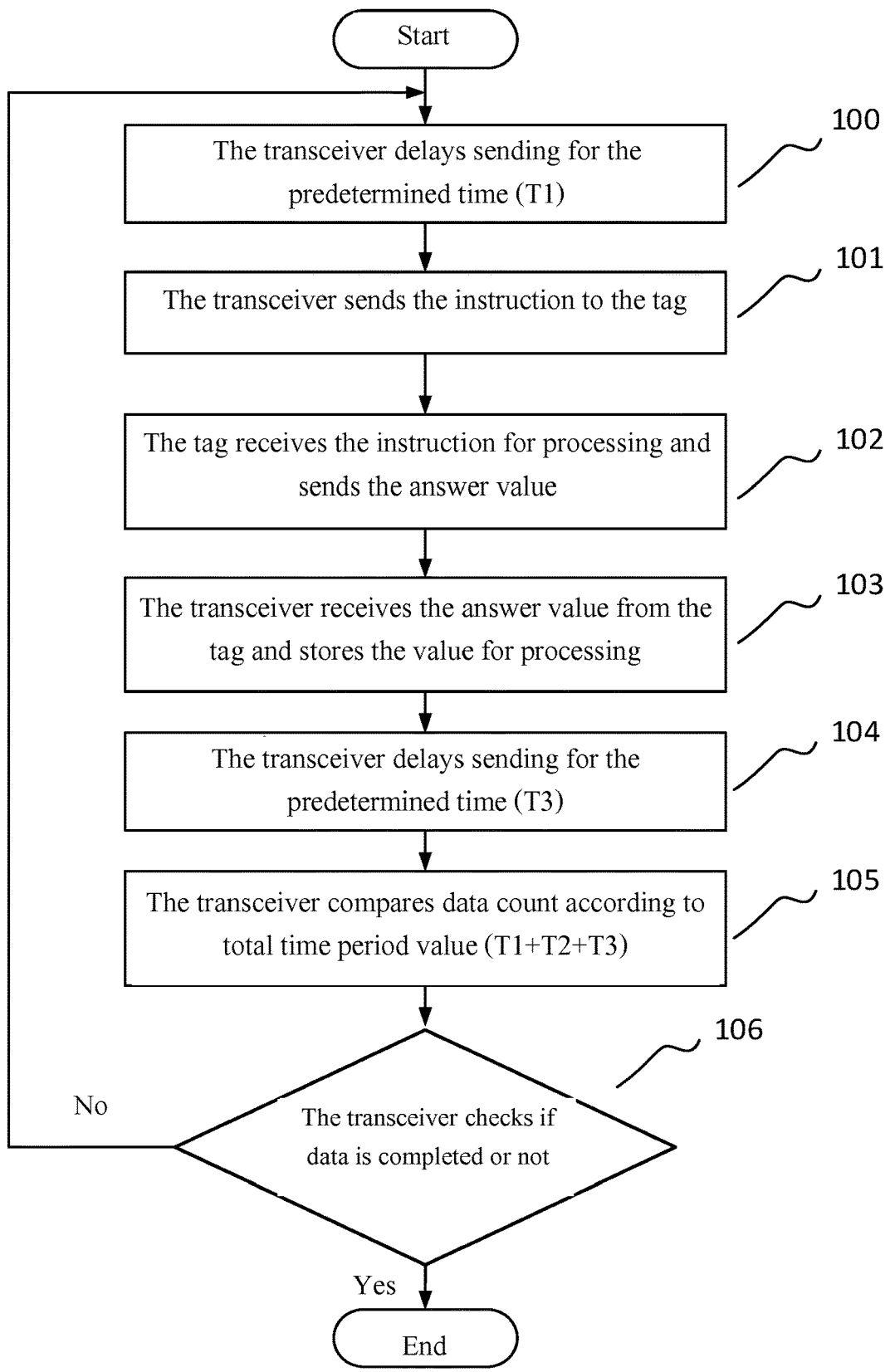
FIG. 1 shows a flowchart illustrating time period value control for constant data acquisition at constant time interval from the tag using an NFC transceiver wherein the NFC transceiver is used to control the entire time.
Figure 2:
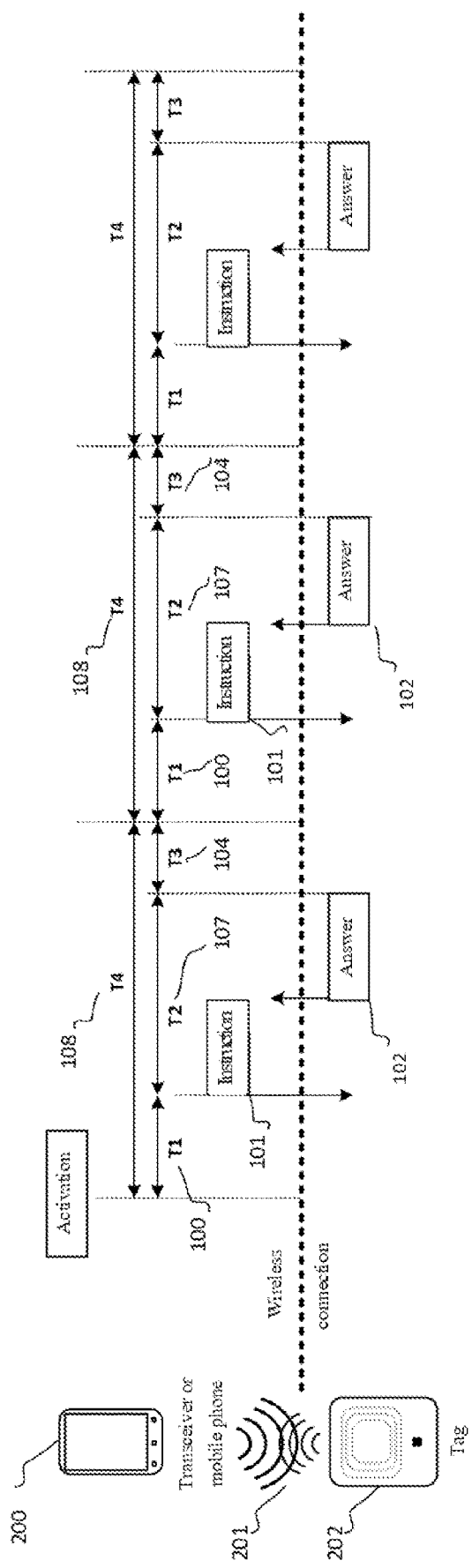
FIG. 2 shows a timeline chart of communication between a transceiver device and a tag for controlling a time period value for constant data acquisition wherein an NFC transceiver is used to control the entire time.
Figure 3:
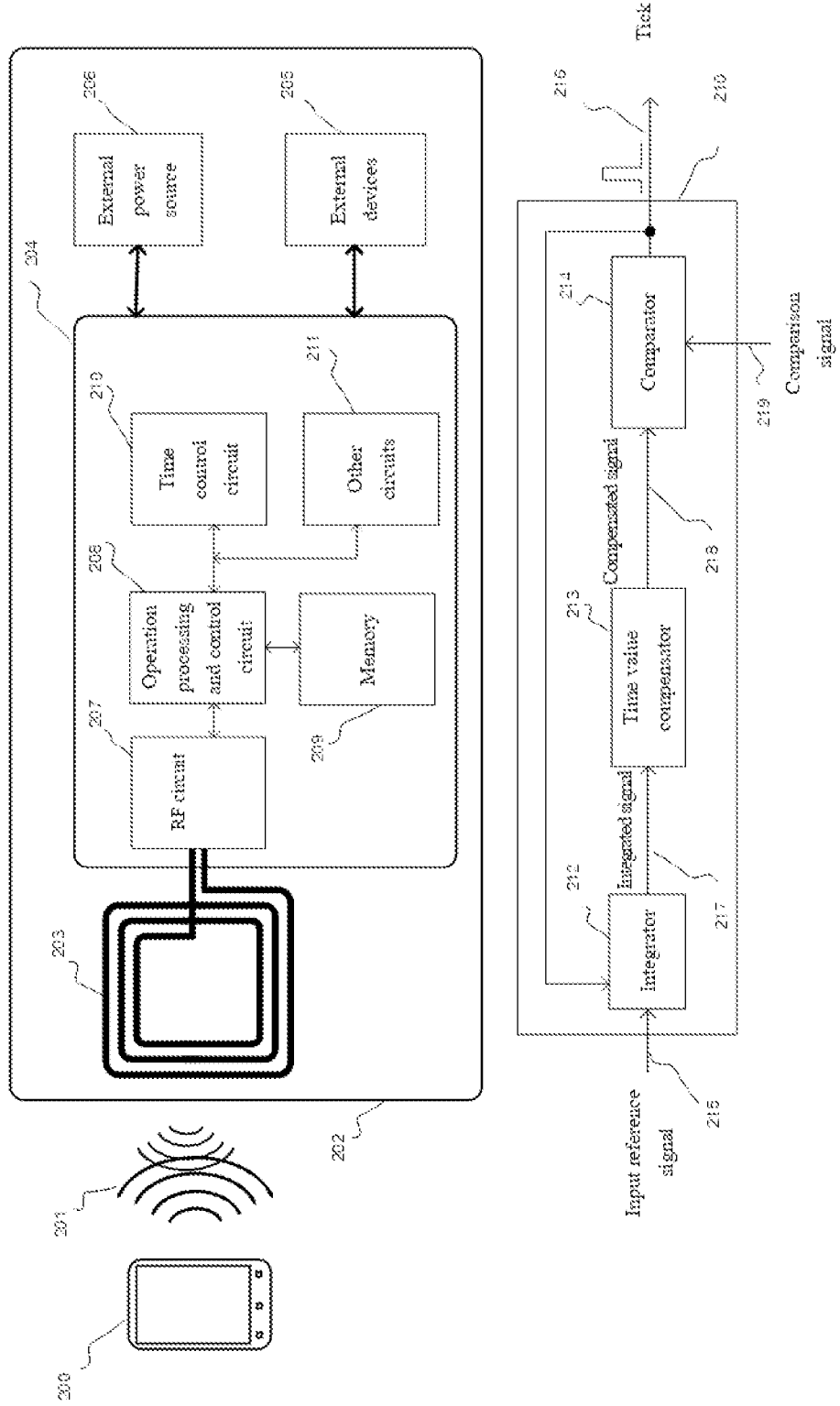
FIG. 3 shows an example of elements in sending-receiving system wherein an NFC transceiver and a tag are used in controlling a time period value for data acquisition according to the present invention.

FIG. 3 shows an example of an embodiment of the constant time period value (307) for data acquisition comprising the NFC transceiver (200) and the tag (202) for using in controlling the time period value (307) for data acquisition.

wherein the NFC transceiver (200) is provided for sending a radio wave frequency of 13.56 MHz for powering and wirelessly communicating with the tag (202), and after the instruction is sent, the tag (202) will provide one or more answer values wherein the tag (202) shall not send the one or more answer values by itself unless it is received the instruction. The instruction can be more than 1 instruction.

The tag (202) comprises an antenna (203) provided for receiving power and communicating with the NFC transceiver (200), a microchip (204) provided for processing, external devices (205), and an external power source (206).

The tag (202) can be operated either with connected external power source (206) or without one while receiving power from the NFC transceiver (200).

The external devices (205) are provided for connection with the microchip (204) to make system's operation completely e.g., a microcontroller, sensor, amplifying circuit, and external memory.

The microchip (204) comprises at least an RF circuit (207) provided for communication and conversion of radio wave signal to power for the microchip (204), an operation processing and control circuit (208) provided for controlling all operations of the microchip (204) and for communicating between components in the microchip, a memory (209) provided for storing a unique identifier (UID) or other data, the time control circuit (210) provided for starting and stopping counting depending on the instruction from the NFC transceiver (200) and for setting the time period value (307), which causes generating the tick (216) and automatically restarting counting and one or more other circuits (211).

The one or more other circuits (211) include a sensor connecting circuits, amplifying circuit, analog-to-digital converting circuit, digital-to-analog converting circuit, reference signal generating circuit, clock signal generating circuit, interfacing pins for connection with external devices for further applications in various fields.

The time control circuit (210) comprises the integrator (212), the time value compensator (213), and the comparator (214) and can be embodied either as the digital circuit or as the analog circuit.

The time control circuit (210) that can be embodied either as the digital circuit or as the analog circuit is provided for receiving the input reference signal (215) from the operation processing and control circuit (208) that can be the digital signal e.g., clock signal or the analog signal e.g. the voltage value or the current value to cause the provided integrator (212) to determine clock signal count as a counter in case the input reference signal (215) is the digital signal e.g., the clock signal or to perform periodic integrating (integrator) in case the signal in is the analog signal e.g., the voltage value or the current value and the like. The digital and the analog signal from input reference signal (215) can be more than 1 signal.

The signal acquired from the integrator (212) called as an integrated signal (217) is sent to the time value compensator (213) provided for modifying the signal acquired from the integrator (212) to be a suitable value in case the input reference signal (215) is deviated from a required value e.g. the clock signal is incomplete, the clock signal has incorrect frequency, or the electrical voltage or the current value is different from the predetermined value or changes over time due to data sending from the NFC transceiver (200).

A compensated signal (218) from the time value compensator (213) is compared with one or more comparison signals (219) using the comparator (214) wherein the one or more comparison signals (219) is controlled by the operation processing and control circuit (208) provided for setting the value of a time period (307) the system, which is also called Tperiod.

After the compensated signal (218) become equal to the one or more comparison signals (219), the comparator (214) will generate the tick (216) provided to be sent to the operation processing and control circuit (208) for use in starting the process of sending answering to the NFC transceiver (200).

Meanwhile, the tick (216) causes the integrator (212) to reset the count and restart counting automatically in case the input reference signal (215) is the digital signal e.g., the clock signal. In another aspect of the invention, the tick (216) causes the integrator (212) to reset the integration and restart integrating automatically in case the input reference signal (215) is the analog signal e.g., the electrical voltage or the current value and the like.

Figure 4:
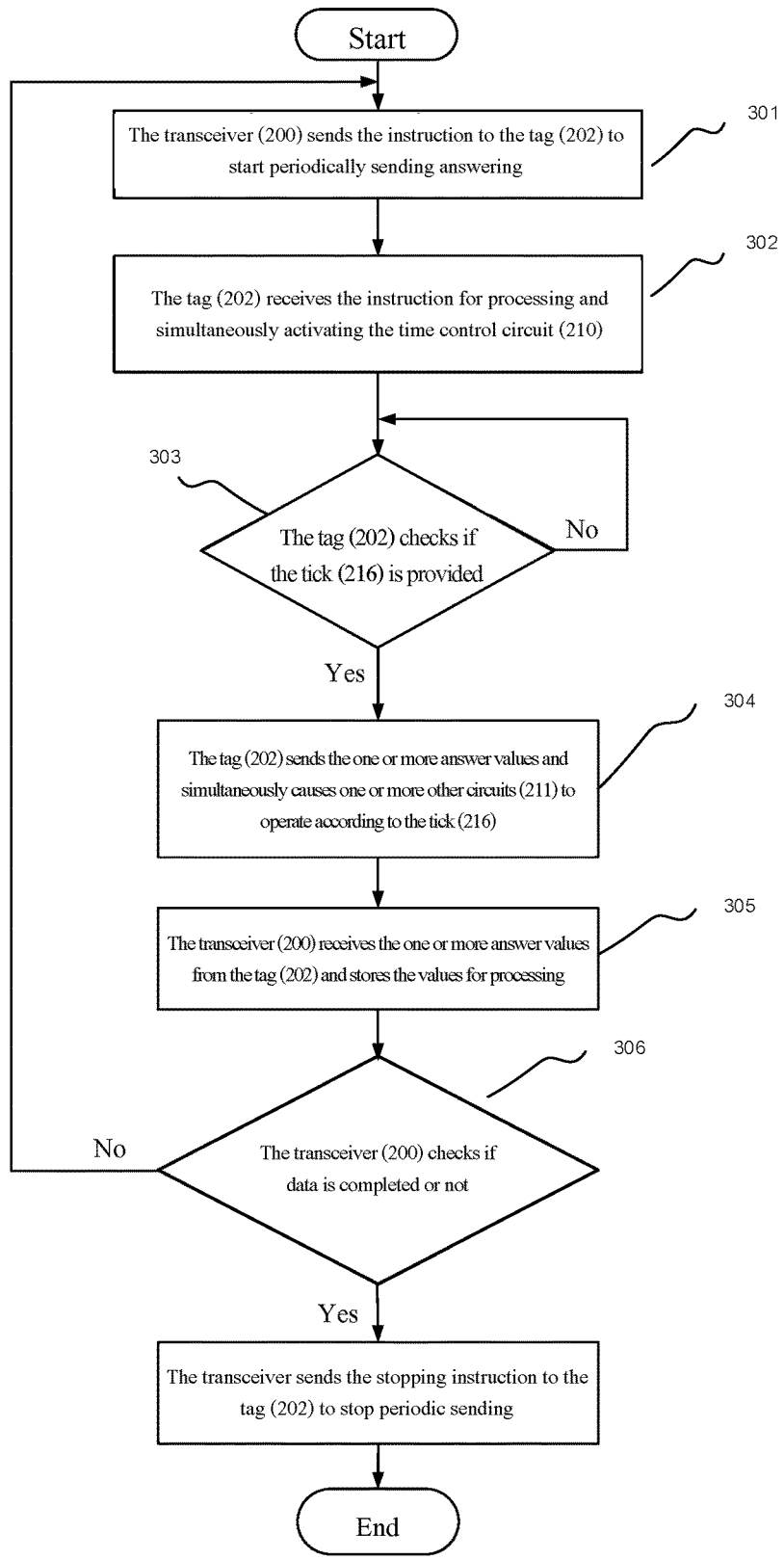
FIG. 4 shows a flowchart illustrating time period value control for constant data acquisition at constant time interval from a tag using the NFC transceiver based on data acquisition according to the present invention.

FIG. 4 shows a flowchart of an exemplary embodiment of the constant time period value (307) system according to the present invention. Step 301 starts the operating process of the constant time period value (307) system according to the present invention by the NFC transceiver (200) sending the instruction to the tag (202) via a radio wave frequency of 13.56 MHz (201). After the tag (202) receives the instruction, power will be accumulated until the tag (202) is ready for operation and for activating the time control circuit (210) in step 302. The control circuit (208) of the tag (202) starts detecting the tick (216) in step 303.

The operation processing and control circuit (208) causes the tag (202) to provide answering to the NFC transceiver (200) in step 304 when the tick (216) is detected and to activate the one or more other circuits (211) or is delayed until the one or more answer values are provided by the tag (202) to the NFC transceiver (200) when the tick (216) is not detected.

In step 305, when the tag (202) detects the tick (216), the tag (202) will send the one or more answer values to the NFC transceiver (200) wherein the NFC transceiver (200) will store the value for processing.

In step 306, the NFC transceiver (200) sends a stopping instruction to the tag (202) to stop operation after the NFC transceiver (200) receives complete data or denies sending the stopping instruction to the tag (202) when the NFC transceiver (200) do not receive complete data and allows reactivation of steps 301 to 306 until the NFC transceiver (200) receives complete data.

Figure 5:
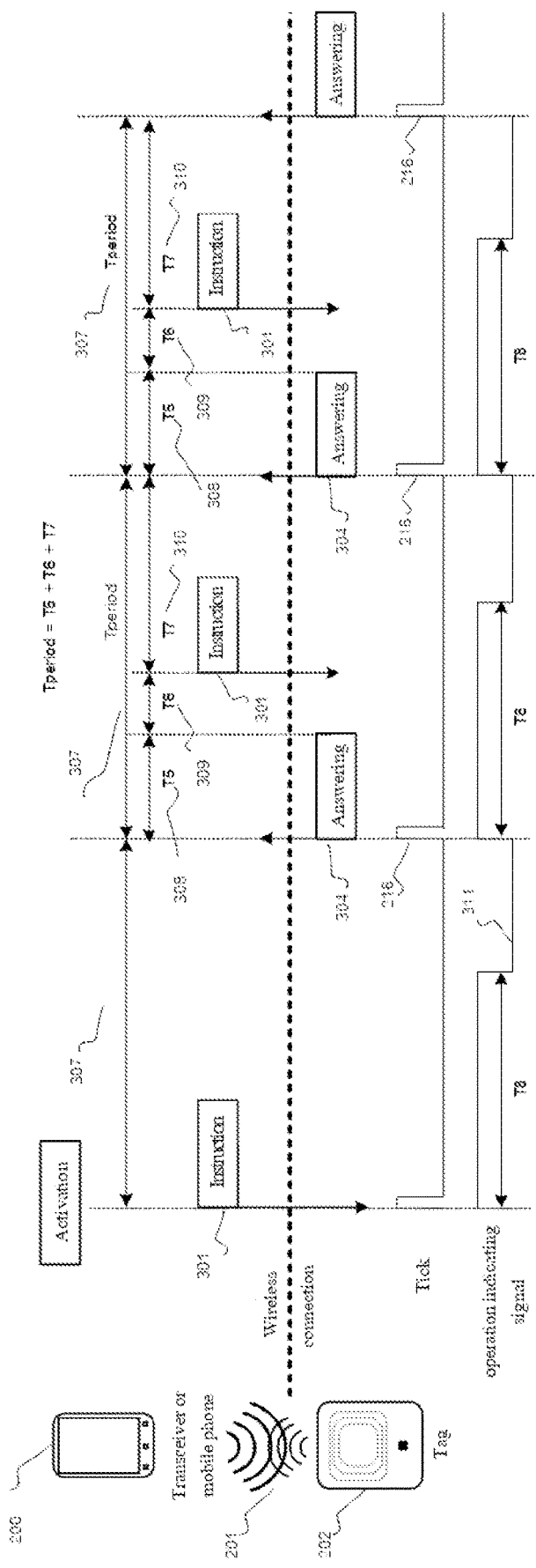
FIG. 5 shows a timeline chart of communication between the transceiver device and the tag for controlling a time period value for constant data acquisition based on data acquisition according to the present invention.

FIG. 5 shows a timeline chart of communication between the transceiver device (200) and the tag (202) for constant data acquisition using the constant time period value (307) from the tag (202) according to the data acquisition principle of the present invention. When the operation is started, the transceiver (200) sends the instruction to the tag (202) which in turn receives the instruction and starts sending answering and, at the same time, activates the time control circuit (210) to operate following the predetermined time period value (307) which is also called Tperiod.

The tag (202) will not immediately send answering, on the contrary, the tag (202) will be delayed until the operation processing and control circuit (208) detects the tick (216) sent from the time control circuit (210) after it operates for the predetermined time period value (307) completely wherein the time period value (307) for sending the tick (216) is set to be in a constant rate and to automatically restart.

After the tag (202) detects the tick (216) from the time control circuit (210), the operation processing and control circuit (208) will cause the tag (202) to send the one or more answer values (304) to the NFC transceiver (200) and at the same time applies the tick (216) for generating one or more operation indicating signals (311) to cause the one or more other circuits (211) to operate periodically. The other circuits (211) include e.g., analog-to-digital converting circuit, digital-to-analog converting circuit, sensor connecting circuit, amplifying circuit, reference signal generating circuit, clock signal generating circuit, interfacing pins for connection with external devices. At least 1 line of the one or more operation indicating signals (311) is provided wherein the one or more lines of the one or more operation indicating signals (311) reflects the operation of internal circuits of respective the one or more other circuits (211) correspondingly. That is to say, generation of the one or more operation indicating signals (311) means that operation of the internal circuits is performed in the one or more other circuits (211) and, on the other hand, absence of the one or more operation indicating signals (311) means inactivation of the internal circuits of the one or more other circuits (211). Each of the line may have different operating duration (T8) depending on requirements of the one or more other circuits (211) but not exceeding sum of T5 (308), T6 (309), and T7 (310).

In this regard, operation of the one or more other circuits (211) can be automatically activated when the tag (202) detects the tick (216).

With regard to the NFC transceiver, after the tag sends the one or more answer values the NFC transceiver (200) will store the one or more answer values for processing wherein the time for operation of the transceiver (200) after receiving the one or more answer values is T5 (308). Then the transceiver may be delayed for T6 (309) to wait for the next instruction of the next cycle to be sent to the tag (202).

Sending the next instruction to the tag (202) is automatically performed until the NFC transceiver (200) receives predetermined complete data in step 306. Then the stopping instruction for the tag (202) is sent to the tag (202).

After T6 (309) ends, the NFC transceiver (200) will send the next instruction to the tag (202) wherein it will receive the instruction and process. After processing is completed, the tag (202) will wait until the next tick (216) is detected and, then the tag (202) sends the next one or more answer values (304) to the NFC transceiver (200) and starts periodic operation controlled by the one or more operation indicating signals (311). The time duration from sending the instruction (301) by the NFC transceiver (200) to sending the one or more answer values by the tag (202) after the tick (216) is detected is T7 (310).

In addition, in T7 duration, processing of the instruction sent from the NFC transceiver (200) is completed and ready answering to the NFC transceiver (200) always before the next tick (216) is sent from the time control circuit (210).

The sum of duration T5 (308), T6 (309), and T7 (310) is the system time period value (307) which is the time period from sending the one or more answer values by the tag (202) after the tick (216) is detected to sending the next one or more answer values by the tag (202) after the next tick (216) is detected.

In addition, each of the duration T5 (308), T6 (309), and T7 (310) as mentioned in the present invention is not limited to be certainly constant time values but can be different in each cycle of signal receiving/transmitting but the sum of thereof must be equal to the system time period value (307) set before the operation is started.

What is claimed is:

1. A method for sustaining a constant time period value for operation and answering by a tag for an NFC transceiver, the method comprising:
the NFC transceiver sending an instruction to the tag to cause the tag to start a process for sending one or more answer values at a predetermined time period value;
a time control circuit in the tag started operating for the predetermined time period value or T_period;
when having operated for the predetermined time period value completes, the time control circuit sending a tick and restarting counting automatically;
when the tick is detected by the tag, sending the one or more answer values to the NFC transceiver and the tick to be applied for generating one or more operation indicating signals to cause other one or more other circuits to start periodic operation;
the NFC transceiver processing the acquired one or more answer values;
the NFC transceiver sending next instruction to receive the one or more answer values, sending the next instruction to the tag being performed consecutively and automatically until the NFC transceiver receives required amount of data completely; and
when the NFC transceiver receives the required amount of data completely, the NFC transceiver sending a stopping instruction to the tag to stop the periodic operation and sending the one or more answer values,
wherein a period from sending the next instruction by the NFC transceiver to sending the next one or more answer values by the tag after the tick is detected is period T7,
and wherein the processing of the instruction sent from the NFC transceiver by the tag is completed, and the one or more answer values is ready to be sent to the NFC transceiver always within the period T7 before the next tick is detected from the time control circuit.

2. The method for sustaining a constant time period value according to claim 1 wherein the tick is sent from the time control circuit generated at a constant rate at the predetermined time period value.

3. The method for sustaining a constant time period value according to claim 1 wherein the predetermined time period value is set to be constant by setting before the operating process is started.

4. The method for sustaining a constant time period value according to claim 1 wherein at least one line of the one or more operation indicating signals is present.

5. The method for sustaining a constant time period value according to claim 1 wherein the one or more other circuits have a different operating duration (T8) depending on requirements of the controlled other circuits.

6. The method for sustaining a constant time period value according to claim 1 wherein a period from starting the one or more answer values sent by the tag to the NFC transceiver to the completion of sending is period T5.

7. The method for sustaining a constant time period value according to claim 1 wherein after the NFC transceiver receives the one or more answer values, the one or more answer values is processed, and a delay may be performed before sending the next instruction to the tag within period T6.

8. The method for sustaining a constant time period value according to claim 1,
wherein a period from starting the one or more answer values sent by the tag to the NFC transceiver to the completion of sending is period T5,
wherein after the NFC transceiver receives the one or more answer values, the one or more answer values is processed, and a delay may be performed before sending the next instruction to the tag within period T6, and
wherein the sum of T5, T6, and T7 is the predetermined time period value.

9. The method for sustaining a constant time period value according to claim 5,
wherein a period from starting the one or more answer values sent by the tag to the NFC transceiver to the completion of sending is period T5,
wherein after the NFC transceiver receives the one or more answer values, the one or more answer values is processed, and a delay may be performed before sending the next instruction to the tag within period T6, and
wherein T8 is not more than the sum of T5, T6, and T7.

10. The method for sustaining a constant time period value according to claim 1,
wherein a period from starting the one or more answer values sent by the tag to the NFC transceiver to the completion of sending is period T5,
wherein after the NFC transceiver receives the one or more answer values, the one or more answer values is processed, and a delay may be performed before sending the next instruction to the tag within period T6, and
wherein T5, T6, and T7 are not restricted to a certain constant time value and can be different in each cycle of signal sending or receiving but the sum thereof must be equal to the time period value.

11. An apparatus for sustaining a constant time period value wherein a tag apparatus provides for sustaining a constant time period value for operation and answering by tag for an NFC transceiver comprising:
a time control circuit provided to allow starting and stopping time counting according to an instruction from the NFC transceiver and to set a predetermined time period value to generate a tick for automatic restarting of time counting when reaching the predetermined time period value, the generation of the tick starting from receiving a input reference signal from an operation processing and control circuit and processed via apparatus in the time control circuit comprising: an integrator provided to determine a clock signal count as a counter in case the input reference signal is a digital signal or to integrate periodic value in case the input reference signal is an analog signal; a time value compensator for modifying the signal acquired from the integrator to be a suitable value in case the input reference signal is deviated from a required value; and a comparator for comparing a compensated signal from the time value compensator and one or more comparison signals wherein when the compensated signal equals to the one or more comparison signals, the comparator will generate the tick provided to restart the automatic counting and send the tick to the operation processing and control circuit, wherein the tick is used in starting a process for sending one or more answer values to the NFC transceiver and the tick is simultaneously used in generating one or more operation indicating signals to cause other circuits to perform as periodic operation,
wherein a period from sending the next instruction by the NFC transceiver to sending the next one or more answer values by the tag after the tick is detected is period T7, and
wherein the processing of the instruction sent from the NFC transceiver by the tag is completed, and the one or more answer values is ready to be sent to the NFC transceiver always within the period T7 before the next tick is detected from the time control circuit.

12. The apparatus for sustaining a constant time period value according to claim 11 wherein the input reference signal which is the digital signal is in the form of the clock signal.

13. The apparatus for sustaining a constant time period value according to claim 11 wherein the input reference signal which is the analog signal is in the form of a voltage value or a current value.

14. The apparatus for sustaining a constant time period value according to claim 11 wherein the one or more comparison signals is controlled by the operation processing and control circuit.

15. The apparatus for sustaining a constant time period value according to claim 11 wherein the one or more comparison signals is provided for determining the system time period value.

16. The apparatus for sustaining a constant time period value according to claim 11 wherein the time control circuit can be as an analog circuit or a digital circuit.

17. The apparatus for sustaining a constant time period value according to claim 11 wherein the input reference signal deviates from the required value i.e. the clock signal is incorrect, incomplete, has incorrect frequency; or voltage value or current value is different from the required value.

18. The apparatus for sustaining a constant time period value according to claim 11 wherein the one or more other circuits include sensor connecting circuit, amplifying circuit, analog-to-digital converting circuit, digital-to-analog converting circuit, reference signal generating circuit, clock signal generating circuit, legs or wires for connection with external devices.

19. The apparatus for sustaining a constant time period value according to claim 14 wherein the one or more comparison signals is provided for determining the system time period value.

20. The apparatus for sustaining a constant time period value according to claim 12 wherein the input reference signal deviates from the required value i.e. the clock signal is incorrect, incomplete, has incorrect frequency; or voltage value or current value is different from the required value.

21. The apparatus for sustaining a constant time period value according to claim 13 wherein the input reference signal deviates from the required value i.e. the clock signal is incorrect, incomplete, has incorrect frequency; or voltage value or current value is different from the required value.

\* \* \* \* \*